US005340854A

United States Patent [19]

Martic et al.

[11] Patent Number: 5,340,854

[45] Date of Patent: Aug. 23, 1994

[54] POLYOLEFIN COMPOSITION CONTAINING OPTICAL BRIGHTENERS HAVING REDUCED MIGRATION

[75] Inventors: Peter A. Martic; Todd R. Skochdopole, both of Rochester, N.Y.

[73] Assignee: Eastman Kodak Company, Rochester, N.Y.

[21] Appl. No.: 6,293

[22] Filed: Jan. 14, 1993

Related U.S. Application Data

[62] Division of Ser. No. 774,955, Oct. 11, 1991, Pat. No. 5,198,330.

[51] Int. Cl.$^5$ .......................... C08J 5/00; C08B 37/16

[52] U.S. Cl. ...................................... 524/94; 430/517; 430/536; 430/538; 536/103

[58] Field of Search ................ 536/103; 430/517, 536, 430/538; 524/94

[56] References Cited

U.S. PATENT DOCUMENTS

| | | | |
|---|---|---|---|
| 3,260,715 | 7/1966 | Saunders . | |
| 3,449,257 | 5/1969 | Tuite et al. . | |
| 3,501,298 | 3/1970 | Crawford . | |
| 4,188,220 | 2/1980 | Kasugci et al. . | |
| 4,476,153 | 10/1984 | Kirtani et al. . | |
| 4,542,445 | 10/1985 | Asahina et al. . | |
| 4,665,014 | 5/1987 | Katsura . | |
| 4,794,071 | 12/1988 | Tomko et al. . | |
| 4,859,539 | 8/1989 | Tomko et al. . | |
| 4,933,948 | 6/1990 | Herkstroeter . | |
| 4,935,298 | 6/1990 | Dathlefs et al. . | |
| 5,008,178 | 4/1991 | Thillo et al. . | |
| 5,200,517 | 4/1993 | Uematsu et al. | 536/103 |

FOREIGN PATENT DOCUMENTS

| | | |
|---|---|---|
| 4140830 | 6/1992 | Fed. Rep. of Germany . |
| 88/07703 | 10/1988 | World Int. Prop. O. . |

*Primary Examiner*—Jack P. Brammer
*Attorney, Agent, or Firm*—Robert A. Gerlach

[57] ABSTRACT

An improved photographic support, especially useful for color prints, is comprised of a paper base material having thereon a polyolefin coating containing a white pigment and an optical brightener, such as a mixture comprising inclusion compounds of certain fluorescent bis(benzoxazolyl)-stilbenes.

4 Claims, No Drawings

POLYOLEFIN COMPOSITION CONTAINING OPTICAL BRIGHTENERS HAVING REDUCED MIGRATION

This is a divisional of application Ser. No. 774,955, filed Oct. 11, 1991, now U.S. Pat. No. 5,198,330.

FIELD OF THE INVENTION

This invention relates to an improved optical brightener. More particularly, it relates to an inclusion compound having equimolar amounts of a fluorescent bis(-benzoxazolyl) stilbene and a cyclodextrin. The invention also relates to the use of such inclusion compounds as optical brighteners in photographic elements having a paper support.

BACKGROUND OF THE INVENTION

A valuable class of photographic supports and elements comprises a paper base material having thereon a polyolefin coating Containing a white pigment and an optical brightener. Such supports are particularly useful in the preparation of photographic elements such as color prints because they exhibit good brightness and excellent dimensional stability and are highly resistant to the action of aqueous acid and alkaline photographic processing solutions. The polyolefin coating provides a very smooth surface which is desirable when thin layers, such as silver halide emulsion layers, are to be coated thereover, U.S. Pat. No. 3,411,908 describes such a support which has achieved widespread commercial acceptance.

The purpose of the optical brightener is to make the white areas of the support appear even brighter. The optical brightener fluoresces upon irradiation with UV (ultraviolet) light, emitting visible light, usually bluish in hue, thus enhancing the brightness of the support. Optical brighteners for use in photographic print materials must absorb UV light, especially in the region from 360 to 420 nm, and reemit such light so as to enhance the brightness of the print, and have the desired brightening power. The optical brightener must also be stable to the temperatures, as high as 310°-330° C., used in extruding the polyolefin onto the paper base material.

Moreover, the optical brightener must be nonmigrating so that it remains in the polyolefin coating and does not exude as a surface film on the polyolefin. Such exudation not only can give rise to a nonuniform brightness of the reflection surface of the support, but also readily transfers to any other surface contacted with it. For example, brightener transferred nonuniformly to the back side of the adjacent layer of support results in visual imperfections. Brightener when migrated to the surface of the front side, can when wound in roll form, adversely affect subsequent coating and finishing operations and, in consequence, the quality and performance of the final element.

In general, prior art brighteners do not exhibit the combination of absorption/emission characteristics and brightening power, heat stability, and resistance to brightener exudation to the levels desired for photographic supports and elements. Thus, what has been desired is a photographic element comprising an optically brightened support, such support having improved resistance to brightener exudation and wherein the brightener exhibits excellent absorption/exmission characteristics, brightening power and heat stability.

Tomko et al U.S. Pat. No. 4,794,071, provides a particularly efficacious photographic element containing a fluorescent bis(benzoxazolyl) stilbene optical brightener mixture that has a reduced tendency to migrate. The support provided by Tomko is especially useful for color prints, and is comprised of a paper base material having thereon a polyolefin coating containing a white pigment and a mixture of optical brighteners, such mixture comprising certain fluorescent bis(benzoxazolyl)-stilbenes. The support exhibits improved brightness at low brightener concentration and unexpected resistance to brightener exudation.

This invention provides, in one aspect, an improvement in the elements of Tomko et al. Thus, this invention provides an improved brightener which is complexed with a cyclodextrin. It also provides the use of such brightener inclusion compounds in photographic elements having a paper support. Complexed brighteners of this invention having a reduced tendency to migrate compared to the uncomplexed brighteners of Tomko et al.

In summary, it is desirable to have resin-coated paper used as a support for reflective photographic prints to have a bluish hue so that once the emulsion is placed on it a white $D_{min}$ results. In order to obtain a bluish tint, either pigments, dyes or optical brighteners may be added to the polyethylene. The method of adding the optical brighteners is preferred, since this does not result in a loss of brightness, which is the case for either pigments or dyes. However, it is known that many optical brighteners tend to migrate from the polyethylene, even at relatively low levels, due to limited solubility. This migration phenomenon is not desirable since it can cause non-uniform color of the support or may contaminate subsequent coating operations, or may cause the emulsion to not properly adhere to the support. Therefore, in the art, optical brighteners can only be used in limited amounts, and the rest of the bluish tint must be acquired using pigments and/or dyes. Thus, it is desirable to improve $D_{min}$ in the support via use of an optical brightener that has a lessened tendency to migrate during prolonged storage or shipping, prior to sensitizing. This invention satisfies that need.

RELATED ART

U.S. Pat. No. 3,501,298 describes a photographic element having a support comprising a paper base having thereon a polyolefin coating which contains titanium dioxide and bis(alkylbenzoxazolyl)thiophenes.

U.S. Pat. No. 3,449,257 relates to compositions comprising hydrophobic polymers and nonmigrating optical brighteners and to paper supports coated with such compositions. The nonmigrating optical brighteners are 2,5-bis(benzoxazolyl)thiophenes.

U.S. Pat. No. 3,260,715 discloses fluorescent bis(benzoxazolyl)stilbenes, such as 4,4'-bis(benzoxazol-2-yl)stilbene, which are useful as fluorescent brightening agents for textile fibers, papers, resins and photographic color print materials.

U.S. Pat. No. 4,933,948 provides aqueous solutions useful in dye lasers contain a substituted cyclodextrin-fluorescent dye inclusion compound, and an excess of the cyclodextrin. Such solutions give greater fluorescent yields than similar inclusion compounds made from non-substituted cyclodextrins. Cyclodextrins have found applications in many areas. In the foods technology it is used for encapsulation of flavors, (see Rogers, W. I. et al. (1962), U.S. Pat. No. 3,061,444), for reduction of unpleasant odors (Hamilton, R. W. et al. (1970), U.S. Pat. No. 3,528,819). In his book, "Cyclodextrin Technology", Kluwer Academic Publishers, Dordrecht, the Netherlands, J. Szejtli reviews applications of cyclodextrin in the industry and medicine. Cyclodextrins have found use in separations of various mixtures; this separation was based on selective complexation. Alpha cyclodextrin was found to influence an alkaline hydrolysis of substituted phenyl acetates. Reiners et al. describe the method for reducing the free acid levels of glyceride oils by using cyclodextrins (U.S. Pat. No. 3,491,132).

SUMMARY OF THE INVENTION

In one aspect, this invention provides as a composition of matter, an inclusion compound of (i) a cyclodextrin selected from the class consisting of unsubstituted α, β, and γ, cyclodextrin and α, β, and γ, cyclodextrins having a substituent bonded to an oxygen atom in a glucose unit in said cyclodextrin, said substituent being selected from the class consisting of:

a) alkyl radicals having 1 to 6 carbon atoms, b) radicals having the formula $-(-CH-CH-R^1-O-)_n-H$ wherein $R^1$ is selected from hydrogen and alkyl radicals having up to about six carbon atoms, and n is equal to a small whole number up to six, and c) radicals having the formula $-CHR^1-CHOH-CHR^1$ wherein $R^1$ has the same definition as above, such that said radicals bridge two cyclodextrin rings, and the number of said rings so bridged per molecule is from two to about six; said substituted cyclodextrin having not more than two substituents per glucose unit; said optical brightener having the formula

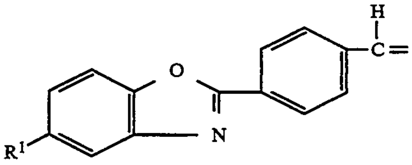

-continued

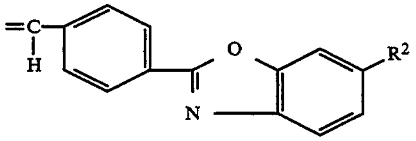

wherein $R^1$ and $R^2$ are independently selected from hydrogen and alkyl radicals having up to about six carbon atoms.

In another aspect, this invention provides a photographic element comprising a paper support, and on at least one side thereof, a polyolefin coating containing an inclusion compound of the type described above.

It has been found in work conducted during development of this invention, that such photographic elements containing an inclusion compound of an optical brightener and a cyclodextrin are highly improved, because the migration behavior of the optical brightener is significantly retarded. Thus, the photographic elements have more uniform color, and improved adherence of emulsion layers to the support.

For these reasons, it is believed that this invention is a significant advance in the art, and readily adaptable by industry.

DESCRIPTION OF PREFERRED EMBODIMENTS

The invention hereinafter described particularly with regard to preferred embodiments as an optically brightened photographic support and a photographic element comprising such support. In addition, the invention is useful in other applications wherein an optically brightened polyolefin coating resistant to brightener exudation is desired.

The photographic support of this invention comprises a paper base material having thereon a polyolefin coating containing a white pigment and which is present in an inclusion compound with a cyclodextrin.

In a highly preferred embodiment, the optical brightener is a compound having formula I above. For these compounds, $R^1$ and $R^2$ are preferably the same. However, as illustrated below, it is not necessary that they be the same. Thus for example one may use a mixutre of brighteners such as a mixture of compounds (A), (B) and (C):

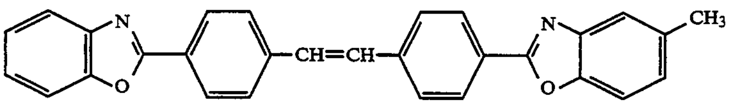

(A)

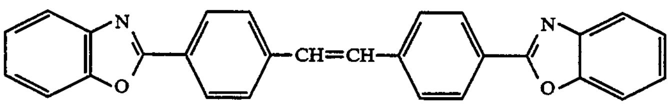

(B)

and

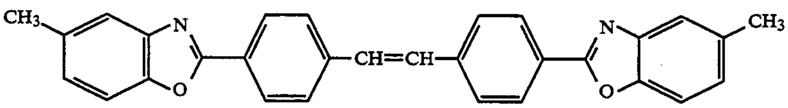

(C)

The above-noted bis(benzoxazolyl)stilbenes are known optical brighteners. To obtain a mixture of such compounds, the individual compounds can be mixed according to conventional means or the mixture can be obtained as the product of the method of synthesis utilized. The individual compounds can be prepared by methods known in the art.

For example, compound A can be prepared by chlorination of a (benzoxazolyl)stilbenecarboxylic acid and subsequent reaction with an aminophenol. Details of such a preparation can be found in U.S. Pat. No. 4,282,355, the disclosure of which is hereby incorporated by reference.

Compound B can be prepared by the method described in U.S. Pat. No. 3,260,715, the disclosure of which is hereby incorporated by reference. Briefly, such method, illustrated particularly in Example 1 therein, comprises chlorination of a 4,4'-stilbenedicarboxylic acid and subsequent reaction with o-aminophenol.

Compound C can be prepared as described in U.K. Patent Specification No. 1,026,368 the disclosure of which is hereby incorporated by reference. Such preparation comprises the step of reacting 1-amino-2-hydroxy-5-methylbenzene with 4,4'-stilbenedicarboxylic acid.

Alternatively, the mixture of (A), (B) and (C) can be conveniently obtained as a reaction product. For example, the mixture can be obtained by reaction 4,4'-stilbenedicarboxylic acid with 1-amino-2-hydroxy-5-methyl-benzene and 1-amino-2-hydroxybenzene in various proportions. This method is further described in U.S. Pat. No. 3,366,575, the disclosure of which is hereby incorporated by reference.

The relative amounts of components (A), (B) and (C) required to be present in the mixture to achieve the intended effects can be widely varied, as desired. Preferred mixtures include by weight about 15–90 percent of component (A), about 5–70 percent of component (B), and about 5–70 percent of component (C), such percentages being based on the total weight of the mixture. Highly preferred mixtures include about 40–70 percent of compound (A), about 10–35 percent of (B), and about 10–35 percent of (C).

The cyclodextrins are rings of 6, 7, or 8 glucose units, and such rings are generally referred to as $\alpha$, $\beta$ and $\gamma$ cyclodextrin respectively. Unsubstituted cyclodextrins can be used to form the inclusion compounds of this invention. However, for this invention it is preferred that the cyclodextrins be substituted. Methyl $\beta$ cyclodextrin is a highly preferred starting material for this invention.

The cyclodextrins used in this invention have an internal cavity that is not so large that two or more optical brightener molecules fit therein. $\beta$ cyclodextrins are preferred for this invention. However, $\alpha$ and $\gamma$ cyclodextrins can be used, when one molecule of optical brightener fits in the cavity thereof.

The substituted cyclodextrins employed in this invention are preferably selected from several types of compounds. First, it is preferred that the cyclodextrin be an $\alpha$ or $\gamma$-cyclodextrin, i.e., that it have six or seven glucose units in the ring. More preferably, the substituted cyclodextrin is a beta cyclodextrin, i.e., it has seven glucopyranose units in the ring. The substituted alpha cyclo-dextrins can be used when the dye molecules are of a sufficient size to fit within the cavity formed by the ring of glucopyranose units. Second, it is preferred that the substituent or substituents in the cyclodextrin molecules be bonded to an oxygen atom in a ring glucose unit. It is also preferred that when the cyclodextrin has two or more substituents per molecule, the substituents be the same. Such compounds are preferred because they are more generally available; however, it is to be understood that this invention is not limited to their use.

Each glucose unit may have a substituent. However, it is not necessary that the cyclodextrin be that heavily substituted. In other words, not all of the ring glucose units need to be substituted. For this invention, it is only necessary that, on average, each cyclodextrin molecule has one substituent per cyclo-dextrin ring. The substituents may be in one or more of the 2-,3-, or 6-positions in the glucopyranose rings.

The cyclodextrin rings may be composed of glucose units (sometimes referred to herein as glucopyranose units) having up to three substituents. Again, it is not necessary that the units be that heavily substituted. Hence, it is preferred that the number of substituents per glucose unit be within the range of from about 0.5 to about 2.0. It is to be understood that the invention extends to the use of cyclodextrins somewhat outside this range. Thus, for example, one may use hexakis and heptakis tri-substituted compounds; i.e., $\alpha$- and $\beta$-cyclodextrins having three substituents per glucose unit.

Compounds of the types discussed above have preferred types of substituents. One preferred type of substituent is an alkyl radical. Of the alkyl radicals, those having up to about six carbon atoms are preferred. The methyl group is a highly preferred substituent, especially when two or more substituents are on one glucose unit in the dextrin ring.

A second preferred type of substituent has the formula $-(CH-CHR^1-O-)_n-H$ wherein $R^1$ is selected from the class consisting of hydrogen and alkyl groups having up to about six carbon atoms. In the above formula, n is a small whole number having a value up to about six; preferably, n is equal to 1. Preferred substituents of this type are hydroxyethyl and hydroxypropyl.

A third type of substituent on the cyclodextrin is a bridging group that links two cyclodextrin moieties. These bridging groups have the formula $-CHR^1-CHOH-CHR^1-$ wherein $R^1$ has the same significance as above. In these polymeric cyclodextrins, the number of cyclodextrin rings so bridged is from about two to about six. In other words, there can be two cyclodextrin rings linked by the bridging group, or there can be three of the rings liked by two bridging groups, and so on, such that there can be six rings linked by five bridging groups. It is to be understood that higher polymers can be used in the invention if they have properties analogous to the polymers within the range given above, and the increased size or molecular weight does not confer an undesirable property to the extent that it makes the material unsuitable for use in the invention.

The polymeric cyclodextrins may have substituents in addition to the group that links or bridges two cyclodextrin moieties. For example, the cyclodextrin moieties may have one or more carboxyalkyl ($-R-COOH$) substituents, wherein R is a lower alkylene radical having up to about 4 carbon atoms. Preferably such a substituent is carboxymethyl; $-CH_2-COOH$. Preferably, there are two carboxymethyl groups per cyclodextrin ring.

For this invention a cyclodextrin, or mixture thereof, is combined with an optical brightener, or mixture thereof, under conditions which allow formation of an inclusion compound, or mixture of inclusion compounds to take place. This invention is not dependent upon the method employed for inclusion compound formation, and any method apparent to a skilled practitioner can be used.

During the course of development of this invention, it was found that a satisfactory method comprises mixing equimolar or substantially equimolar amounts, of cyclodextrin and optical brightener in a solvent such as dimethylformamide (DMF), warming the mixture to allow the dissolution to take place, and then removing the DMF from the resultant emulsion compound.

The amount of the brightener mixture which is used in the present invention is an amount effective to brighten the reflective layer. Such amounts of the mixture can be from 0.01 percent to 0.25 percent by weight based on the total weight of the polyolefin coating, including the white pigment. One employs an amount of brightener sufficient to give the increase in brighteness desired. The amount need not necessarily be the same as when the brightener is employed by itself; that is not in an inclusion compound. In other words, the optical brightness conferred by an inclusion compound may be less than, or greater than the parent optical brightener. Preferably, the amount is from about 0.01 percent to about 0.10 percent by weight in the polyolefin coating. As noted, the mixture is stable to the temperatures as high as 310°–330° C., used in extruding the polyolefin onto the paper base material.

The polyolefin can be any coatable polyolefin material known in the photographic art. Representative of these materials are polyethylene, polypropylene, polystyrene, polybutylene, and copolymers thereof. Polyethylene of low, medium or high density is preferred. The polyolefin can by copolymerized with one or more copolymers including polyesters, such as polyethylene terephthalate, polysulfones, polyurethanes, polyvinyls, polycarbonates, cellulose esters, such as cellulose acetate and cellulose propionate, and polyacrylates. Specific examples of copolymerizable monomers include vinyl stearate, vinyl acetate, acrylic acid, methyl acrylate, ethyl acrylate, acrylamide, methacrylic acid, methyl methacrylate, ethyl methacrylate, methacrylamide, butadiene, isoprene, and vinyl chloride. Preferred polyolefins are film forming and adhesive to paper. Polyethylene having a density in the range of from about 0.910 $g/cm^3$ to about 0.980 $g/cm^3$ is particularly preferred.

The optical brightener mixture can be incorporated into the polyolefin by conventional methods. Preferred are methods whereby the brightener is uniformly dispersed within the polyolefin. Such methods include a melt extrusion process, a kneader extruder, a roll mill, a high shear mixer, or a twin-screw compounder.

The white pigment incorporated in the polyolefin layer can be titanium dioxide, zinc oxide, zinc sulfide, zirconiumdioxide, white lead, lead sulfate, lead chloride, lead aluminate, lead phthalate, antimony trioxide, white bismuth, tin oxide, white manganes, white tungsten and combinations thereof. The pigment is used in any form that is conveniently dispersed within the polyolefin. The preferred pigment is titanium dioxide. The titanium dioxide preferably is anatase, rutile or combinations of these forms. Enhanced image resolution in a photographic element can be obtained by the addition of functional amounts of such highly white-light reflective pigments to the polyolefin layer. Preferably, the white pigment is used in the range from about 3 to 35 percent, more preferably 5 to 25 percent by weight based on the total weight of the polyolefin coating. Titanium dioxide at levels of 5 to 20 percent is particularly useful.

In addition to the brightener mixture and the white pigment, the polyolefin coating can contain, if desired, a variety of additives including antioxidants such as 4,4'-butylidene-bis(6-tert-butyl-meta-cresol), di-lauryl-3,3'-thiodipropionate, N-butylated-p-aminiphenol, 2,6-di-tert-butyl-p-cresol, 2,6-di-tert-butyl-4-methylphenol, N,N-disalicyidene-1,2-diaminipropane, tetra(2,4-ditert-butylphenyl)-4,4'-diphenyldiphenyldiphosphonite, octadecyl 3-(3',5'-ditert-butyl-4'-hydroxyphenyl propionate), combinations of the above, and the like; heat stabilizers, such as higher aliphatic acid metal salts such as magnesium stearate, calcium stearate, zinc stearate, aluminum stearate, calcium palmitate, sodium palmitate, zirconium octylate, sodium laurate, and salts of benzoic acid such as sodium benzoate, calcium benzoate, magnesium benzoate and zinc benzoate; additional optical brighteners; antistatic agents; dispersing agents; uv stabilizers, coating aids; slip agents; lubricants; dyes; and the like, as is well known to those skilled in the art. Additionally, emulsion side resins can contain one or more pigments, such as the blue, violet or magenta pigments described in U.S. Pat. No. 3,501,298, or pigments such as barium sulfate, colloidal silica, calcium carbonate and the like.

The paper base material employed in accordance with the invention can be any paper base material which has heretofore been considered useful for a photographic support. The weight and thickness of the support can be varied depending on the intended use. A preferred weight range is from about 20 $g/m^2$ to about 500 $g/m^2$. Preferred thicknesses (those corresponding to commercial grade photographic paper) are from about 20 $\mu m$ to about 500 $\mu m$. It is preferred to use a paper base material calendered to a smooth surface. The paper base material can be made from any suitable paper stock preferably comprising hard or softwood. Either bleached or unbleached pulp can be utilized as desired. The paper base material can also be prepared from partially esterified cellulose fibers or from a blend of wood cellulose and a suitable synthetic fiber such as a blend of wood cellulose and polyethylene fiber.

As is known to those skilled in the art, the paper base material can contain, if desired, agents to increase the strength of the paper such as wet strength resins, e.g., the amino-aldehyde or polyamide-epichlorohydrin resins, and dry strength agents, e.g., starches, including both ordinary starch and cationic starch, or polyacrylamide resins. In a preferred embodiment of this invention, the amino-aldehyde, polyamide-epichlorohydrin and polyacrylamide resins are used in combination as described in U.S. Pat. No. 3,592,731. Other conventional additives include water soluble gums, e.g., cellulose ethers such a carboxymethyl cellulose, sizing agents, e.g., a ketene dimer, sodium stearate which is precipitated onto the pulp fibers with a polyvalent metal salt such as alum, aluminum chloride or aluminum sulfate; fluorescing agents; antistatic agents; filters, including clays or pigments such as titanium dioxide; dyes; etc.

It is to be understood that although paper is a preferred support, the nature of the support is not a critical feature of the invention. Thus for example the paper support may be substituted by a synthetic paper or a plastic film.

The coating of the paper base material with the polyolefin preferably is by extrusion from a hot melt as is known in the art. The paper base material preferably is treated with corona discharge to obtain good adhesion before the polyolefin coating is extruded thereon, as described in U.S. Pat. No. 3,411,908. The invention can be practiced within a wide range of extrusion temperatures, e.g., 150°-350° C., and speeds e.g., about 60 m/min. to 460 m/min., depending on the particular intended application of the support. For many applications, preferred extrusion temperatures are about 310°-330° C. As noted, it is an advantageous feature of this invention that the mixture of optical brighteners is stable to such temperatures. Under these conditions, the aforedescribed polyolefin coating, over which the silver halide emulsion is applied, is coated onto the paper base material in a coverage of about 1 to 100 g/m$^2$, at a uniform thickness ranging from about 1 to 100 $\mu$m. About the same coverage of clear polyethylene coating preferably is applied to the side of the paper base material opposite to the pigmented polyolefin coating. As such, the polyolefin coatings are particularly effective in preventing acid and alkaline photographic processing solutions from penetrating to the paper base.

As noted, photographic elements in accordance with this invention comprise the above-described optically brightened photographic support and at least one silver halide emulsion layer. Any of the known silver halide emulsion layers, such as those described in *Research Disclosure,* Vol. 176, December 1978, Item 17643 and *Research Disclosure* Vol. 225 January 1983 Item 22534, the disclosures of which are hereby incorporated by reference in their entirety, are useful in preparing photographic elements in accordance with this invention. Generally, the photographic element is prepared by coating the support with one or more layers comprising a dispersion of silver halide crystals in an aqueous solution of gelatin, and optionally, one or more stubbing layers, etc. The coating process is generally carried out on a continuously operating machine wherein a single layer or a plurality of layers are applied to the support. For multilayer elements, layers are generally coated simultaneously on the support as described in U.S. Pat. No. 2,761,791, and U.S. Pat. No. 3,508,947. Additional useful coating and drying procedures are described in *Research Disclosure,* Vol. 176, December 1978, Item 17643.

In a preferred embodiment of this invention, a conventional UV absorbing agent is disposed in the photographic element to enhance speed and improve image stability and/or sharpness.

EXPERIMENTAL

An optical brightener used to demonstrate this invention was Hostalux KS brightener (American Hoechst Corporation, Charlotte, N.C.) Hostalux KS is a mixture having the following composition:

TABLE I

| Optical Brightener | Approximate Percent by Weight |
|---|---|
| Compound A | 60 |
| Compound B | 15 |
| Compound C | 25 |
| | 100 |

Hostalux KS brightener is hereinafter referred to as "Hostalux KS".

Because of its meager solubility in most solvents, a warm (40° C.) dimethyl formamide (DMF), was chosen as the proper solvent. Its mixtures with methyl beta cyclodextrin were made based on an equimolar ratio. Methyl beta cyclodextrin was obtained from Wacker, G.m.b.H., Germany. Its average DS-value (degree of substitution) was 1.8, that means the number of $CH_3$ groups per anhydroglucose unit.

A typical example involved the mixing of 0.750 g Hostalux KS with 2.450 g methyl beta cyclodextrin. The mixture was dissolved in a 1L DMF and the solution was warmed to allow the complete dissolution of the Hostalux. The solution was allowed to evaporate slowly under low heat. Before the total evaporation, the solution was removed into a smaller beaker and sonicated for ca. 1 min. Then, it was placed in an oven at 90° C.; the residual solvent was removed and the mixture was dried for 30 min.

Preblends of 12.5 weight percent anatase $TiO_2$, 3 weight percent ZnO, 1.5 weight percent calcium stearate, 0.10 weight percent antioxidant, low levels of red and blue colorants and various levels and types of optical brighteners (as shown in Table I) in medium density polyethylene, were prepared on a twin screw extruder at around 410° F. These preblends were used to produce coatings on paper using a ¾-inch Brabender extruder. Coatings of approximately 1 mil thick, and 1.5-inch wide were made.

The samples were measured for migration behavior by placing stacks of 12-inch long strips of the resin-coated paper in an oven controlled to either 100° F. or 140° F., both at 50 percent RH. Samples were periodically withdrawn, examined under UV light and given a visual rating based on the amount of the optical brightener present of the surface of the polyethylene coating. The number of days at these conditions to produce a severe level of migration is shown in Table II. A severe level had 20% or more percent of the surface of the coating containing an optical brightener.

TABLE II

| Sample | OB Type | Hostalux Conc'n Weight Percent |
|---|---|---|
| 1 | Hostalux KS | 0.075 |
| 2 | Hostalux KS | 0.10 |
| 3 | Hostalux KS | 0.125 |
| 4 | Hostalux KS/Me-cyclodextrin | 0.05 |
| 5 | Hostalux KS/Me-$\beta$-cyclodextrin | 0.075 |
| 6 | Hostalux KS/Me-$\beta$-cyclodextrin | 0.10 |
| 7 | Hostalux KS/Me-$\beta$-cyclodextrin | 0.125 |

TABLE III

| Sample | Migration (days) 110° F. | 140° F. |
|---|---|---|
| 1 | 55 | 34 |
| 2 | 34 | 6 |
| 3 | 34 | 3 |
| 4 | >55 | >55 |
| 5 | >55 | >55 |
| 6 | >55 | >55 |
| 7 | >55 | >55 |

Table III demonstrates that there is much less migration, when compositions of this invention are used.

Furthermore this invention can be extended to use of inclusion compounds of a cyclodextrin, preferably methyl $\beta$ cyclodextrin with optical brighteners of the type disclosed in U.S. Pat. No. 2,618,636, and U.S. Pat. No. 2,713,046.

This invention has been described with particular reference to preferred embodiments thereof. A skilled practitioner, familiar with the above detailed description can make many substitutions and modifications without departing from the scope and spirit of the following claims.

We claim:

1. A composition of matter comprising an inclusion compound of an optical brightener and a cyclodextrin selected from the class consisting of unsubstituted a, b, and g, cyclodextrin and a, b, and g, cyclodextrin having a substituent bonded to an oxygen atom in a glucose unit in said cyclodextrin, said substituent being selected from the class consisting of:

a) alkyl radicals having 1 to 6 carbon atoms, b) radicals having the formula $—(—CH—CH—R^1—O—)_n—H$ wherein $R^1$ is selected from hydrogen and alkyl radicals having up to about six carbon atoms, and n is equal to a small whole number up to six, and c) radicals having the formula $—CHR^1—CHOH—CHR^1—$ wherein $R^1$ has the same definition as above, such that said radicals bridge two cyclodextrin rings, and the number of said rings so bridged per molecule is from two to about six; said substituted cyclodextrin having not more than two substituents per glucose unit; said optical brightener having the formula

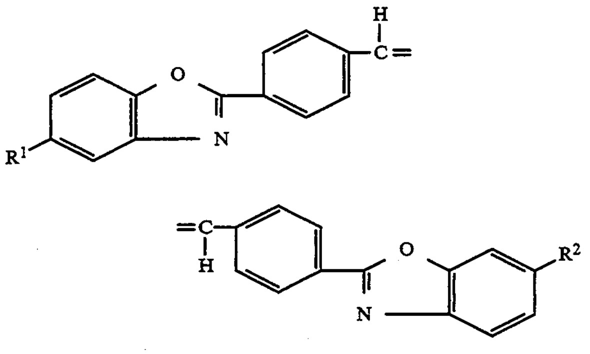

wherein $R^1$ and $R^2$ are independently selected from hydrogen and alkyl radicals having up to about six carbon atoms.

2. A composition of claim 1 wherein said cyclodextrin is selected from said unsubstituted and substituted $\beta$ cyclodextrin.

3. A composition of claim 2 additionally containing a white pigment.

4. A composition of claim 3 wherein said pigment is $TiO_2$.

* * * * *